(12) United States Patent
Criel et al.

(10) Patent No.: US 9,027,781 B2
(45) Date of Patent: May 12, 2015

(54) FUEL TANK WITH IMPROVED MECHANICAL RESISTANCE

(75) Inventors: Bjorn Criel, Sint-Martens-Lennik (BE); David Hill, Commerce Township, MI (US); Benoit Devaux, Brussels (BE)

(73) Assignee: Inergy Automotive Systems Research (Sociate Anonyme), Brussels (BE)

(*) Notice: Subject to any disclaimer, the term of this patent is extended or adjusted under 35 U.S.C. 154(b) by 0 days.

(21) Appl. No.: 14/110,874

(22) PCT Filed: Apr. 4, 2012

(86) PCT No.: PCT/EP2012/056236
§ 371 (c)(1),
(2), (4) Date: Jan. 27, 2014

(87) PCT Pub. No.: WO2012/139962
PCT Pub. Date: Oct. 18, 2012

(65) Prior Publication Data
US 2014/0158696 A1    Jun. 12, 2014

Related U.S. Application Data

(60) Provisional application No. 61/490,053, filed on May 25, 2011, provisional application No. 61/487,387, filed on May 18, 2011, provisional application No. 61/474,427, filed on Apr. 12, 2011.

(30) Foreign Application Priority Data

May 10, 2011 (EP) .................................... 11165495
Jun. 8, 2011 (EP) .................................... 11169114

(51) Int. Cl.
*B60K 15/067* (2006.01)
*B60K 15/03* (2006.01)
(Continued)

(52) U.S. Cl.
CPC ......... *B60K 15/067* (2013.01); *B60K 15/03177* (2013.01); *B60K 2015/03493* (2013.01); *B29L 2031/7172* (2013.01); *B29C 49/20* (2013.01); *B29C 2049/2013* (2013.01)

(58) Field of Classification Search
CPC ..................... B64D 37/02; B64D 2700/62624
USPC ........................ 220/562, 4.14, 651, 652, 653
See application file for complete search history.

(56) References Cited

U.S. PATENT DOCUMENTS 2,333,792 A * 11/1943 Jackson ......................... 220/565
2,407,455 A *  9/1946 Shakesby et al. ............. 220/653
(Continued)

FOREIGN PATENT DOCUMENTS

DE           196 27 742         1/1998
DE      10 2009 036 911         2/2011
(Continued)

OTHER PUBLICATIONS

International Search Report Issued Jun. 25, 2012 in PCT/EP12/056236 Filed Apr. 4, 2012.
(Continued)

*Primary Examiner* — Steven A. Reynolds
*Assistant Examiner* — King M Chu
(74) *Attorney, Agent, or Firm* — Oblon, McClelland, Maier & Neustadt, L.L.P.

(57) ABSTRACT

A fuel tank including two opposite wall portions and at least one reinforcing element connecting the two wall portions, in which the reinforcing element includes a hollow pillar having a ratio of at least 1.8 between the diameter of its cross section at its ends and the diameter of its cross section at least at one intermediate point.

14 Claims, 3 Drawing Sheets

(51) Int. Cl.
*B29L 31/00* (2006.01)
*B29C 49/20* (2006.01)

(56) References Cited

U.S. PATENT DOCUMENTS

| | | | | |
|---|---|---|---|---|
| 3,280,850 | A * | 10/1966 | Aylor et al. | 138/153 |
| 4,231,482 | A * | 11/1980 | Bogan | 220/4.13 |
| 4,634,028 | A * | 1/1987 | de Larosiere | 222/464.2 |
| 5,934,618 | A * | 8/1999 | Kari et al. | 244/135 R |
| 6,135,306 | A * | 10/2000 | Clayton et al. | 220/564 |
| 6,138,859 | A * | 10/2000 | Aulph et al. | 220/563 |
| 6,338,420 | B1 * | 1/2002 | Pachciarz et al. | 220/562 |
| 6,726,967 | B2 * | 4/2004 | Vorenkamp et al. | 428/34.1 |
| 6,857,534 | B1 | 2/2005 | Keller | |
| 7,427,000 | B2 * | 9/2008 | Austerhoff et al. | 220/4.14 |
| 7,455,190 | B2 * | 11/2008 | Potter et al. | 220/4.14 |
| 8,490,807 | B2 | 7/2013 | Varga | |
| 2002/0100759 | A1 * | 8/2002 | Schmidt et al. | 220/564 |
| 2009/0250458 | A1 | 10/2009 | Criel et al. | |
| 2011/0131789 | A1 | 6/2011 | Pohlmann et al. | |
| 2012/0006476 | A1 | 1/2012 | Criel et al. | |
| 2012/0024868 | A1 * | 2/2012 | Menke | 220/653 |
| 2012/0037638 | A1 | 2/2012 | Criel et al. | |

FOREIGN PATENT DOCUMENTS

| | | |
|---|---|---|
| WO | 2006 064004 | 6/2006 |
| WO | 2008 003387 | 1/2008 |
| WO | 2010 023212 | 3/2010 |
| WO | 2010 122065 | 10/2010 |

OTHER PUBLICATIONS

European Search Report Issued Nov. 17, 2011 in EP 11 16 9114 Filed Jun. 8, 2011.

European Search Report Issued Jun. 27, 2012 in EP 11 16 5495 Filed May 10, 2011.

Written Opinion of the International Searching Authority Issued Jun. 25, 2012 in PCT/EP12/056236 Filed Apr. 4, 2012.

* cited by examiner

FUEL TANK WITH IMPROVED MECHANICAL RESISTANCE

The present invention relates to a fuel tank with improved mechanical resistance.

Plastic fuel tanks intended for motor vehicles have to meet specifications that specify maximum permissible amplitudes of deflection on their lower skin. The deflections stated in these specifications usually have to be met during ageing tests in which the tank contains a certain quantity of fuel for a given period of time (typically several weeks) and at temperature (usually 40° C.). The purpose of these specifications is to ensure that vehicles maintain their road clearance and to prevent the skin of the tank from coming into contact with hotspots of the vehicle.

Traditionally fuel systems in passenger vehicles are designed to hold a specific amount of liquid fuel at a pressure essentially the same as the ambient pressure. With the introduction of Hybrid vehicles and more specifically Plug in Hybrids, which are designed such that they could potentially go several months without using fuel, it is in the interest of the system designers to hold pressure inside the fuel tank to limit the emissions that could potentially bleed through the activated carbon canister due to diurnal cycles. In addition, holding pressure ensures that the composition of the fuel stays the same during storage. However, the tanks must be made resistant to this internal pressure. Therefore, as described in patent application WO 2010/122065 in the name of the Applicant, tank reinforcement can be realized by linking two opposite tank surfaces with each other using an internal pillar. However, such reinforcement needs to pass the following 3 rather contradictive tests:

- Long term aging deformation under pressure which needs a very strong pillar.
- Handling drop at 1 m and ambient temperature without any degradation of the system functionalities.
- High speed impact resistance without any damage on the tank skin during the impact; this is characterized by typically a 6 m drop test at −40° C. or a SLED test.

Although a straight pillar is the most evident design since is allows to reduce the stresses inside the pillar based on a rather high cross-section, it was not possible to have good results during high speed impact test such as drop or SLED tests (i.e. a test simulating typical crash velocities and decelerations). In a second step, small notches have been added inside the pillar with the purpose to initiate pillar break during high speed impact test such as drop or SLED tests. However this had no positive impact on the test results.

In the above captioned patent application WO 2010/122065, it is specified that the pillar preferably is a pillar in the architectural sense of the term, i.e. a cylindrical structure having larger cross sections at its ends and smaller cross sections at its centre (in other words: a cross section that decreases from its ends to its centre).

It has now been found that surprisingly, the above mentioned 3 requirements (tests) can be met with a pillar having a ratio of at least 1.8, and preferably, at least 2 between the diameter of its cross section at its ends and at its center. Depending on the material of which the pillar is made, such a ratio can even be 5 or more.

Accordingly, the invention relates to a fuel tank having two opposite wall portions and at least one reinforcing element connecting these two wall portions, in which the reinforcing element comprises a hollow pillar having a ratio of at least 1.8 between the diameter of its cross section at its ends and the diameter of its cross section at at least one intermediate point.

The term "fuel tank" is understood to mean an impermeable tank that can store fuel under diverse and varied environmental and usage conditions. An example of this tank is that with which motor vehicles are equipped.

The fuel tank according to the invention is preferably made of plastic, that is to say made of a material comprising at least one synthetic resin polymer.

All types of plastic may be suitable. Particularly suitable are plastics that belong to the category of thermoplastics.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are: random copolymers, linear block copolymers, other block copolymers and graft copolymers.

One polymer often employed is polyethylene. Excellent results have been obtained with high-density polyethylene (HDPE). Preferably, the tank also comprises a layer of a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to fuel.

A multilayer fuel tank comprising an EVOH layer between two HDPE layers is successfully used in the frame of the invention.

The tank according to the invention comprises a reinforcing element which connects two opposite wall portions i.e. two portions of its wall which face each other. Preferably, these are a lower wall portion (the one mounted facing downwards in the vehicle and which is likely to creep under the weight of the fuel) and an upper wall portion (the one mounted facing upwards and subject to little or no creep during use).

This reinforcing element is by definition rigid, i.e. over the life of the tank, it does not deform by more than a few mm, ideally it deforms by less than 1 mm. By "deformation" in meant in fact, an expansion in the sense that it would space away the two tank wall portions.

According to the invention, this element has the shape of a hollow pillar, i.e. a hollow body (wall delimiting an internal volume that is not filled with the constitutive material thereof) of generally cylindrical shape, having a cross section that varies over its length and the wall thickness of which represents a negligible percentage of its total volume (typically from 0.2% to 0.5%).

In one embodiment, the above "internal volume" is delimited by one external wall in the shape of a hollow pillar. This embodiment is pictured in FIG. 2 attached. In another embodiment, the "internal volume" may be the volume between several ribs (parallel slices) of material, the external envelope of which having the shape of a hollow pillar. This embodiment is pictured in FIG. 4 attached.

According to the invention, said pillar has a large cross section at its ends and a reduced cross section in at least one intermediate part. By "diameter" of a cross section is meant the diameter of the circle into which the cross section fits.

Preferably, the section with a reduced diameter does not extend over the entire length of the pillar. It is preferably located so as to cover the location of maximum stress in the pillar. Generally, it extends on maximum 90% of the pillar length, preferably on maximum 70% of the pillar length and ideally, on maximum 50% of the pillar length. Preferably, the intermediate point with a reduced diameter does not extend over more than 90% of the entire length of the pillar and is located so as to cover the location of maximum stress in the pillar.

Especially in the case where said pillar fulfills another function like for instance a venting function, this location could be limited up to maximum 20% of the pillar length (so as to have a maximum internal volume). In fact, this proportion also depends on the length of the pillar (said proportion increasing when the length decreases) and besides, the diameter of the cross section in that area (of minimum diameter cross section) can be evolutive so that in fact, the minimum diameter is only met at one cross section (or in a very limited area of the pillar). In other words: in one embodiment, the diameter of the cross section in the area of the intermediate point with minimum diameter cross section is not constant.

Also preferably, both ends of the pillar are equipped with connecting flanges i.e. with portions substantially perpendicular to the overall cylindrical surface of the pillar and that can easily be attached to the tank inner surface. In this embodiment, the diameter of the cross section of the end of the pillar is the external diameter of the connecting flange. Generally, the flanges are hollow and comprise a boring/hole having substantially the same dimensions as the upper part of the pillar right above or below the flanges.

Also, in that embodiment, there are preferably two portions of the pillar length where there is a transition in the diameter of the pillar: a first transition portion in the flange area and a second more in the centre of the pillar. The first transition is due to the fact that the width of the weld (or other fixation means) is preferably substantially larger than the width of the pillar body and hence, it is preferably close to the flange. The second transition is preferably substantially in the middle to ensure equal performance from both tank wall portions (top and bottom impacts for example).

Preferably, the pillar has an axis of symmetry in rotation and it has a cross section such that when viewed in a vertical plane comprising said axis, it comprises a portion that has the shape of a diabolo (or of two opposite parabola eventually linked by a portion of constant diameter or of a diameter which decreases from the parabola tops towards the center of said portion). Even more preferably, the parabolic surface on each side of the middle portion of the diabolo is prolonged by a cylindrical portion extending up to the above mentioned flange. In the latter embodiment, the ratio between the diameter of the flange and the diameter of the cylindrical portion is of at least 1.25, preferably at least 2. Also preferably, the ratio between the diameter of the cylindrical portion and the diameter of the central portion is of at least 1.5, preferably at least 2.2.

The aforementioned reinforcing pillar is preferably based on a fuel-resistant material, preferably a plastic and, if the pillar is welded to the tank, it is preferably based on a material compatible with that of the tank (at least at the surface).

Virgin HDPE or HDPE filled with glass fibres or any other type of filler (natural or polymeric fibres), POM (poly-oxy-methylene), PEEK (poly ether ether ketone), PPA (polyphtalimide) etc. may be suitable. Preferably, they are plastic pillars manufactured by injection moulding. It may also be a two-material pillar, one part of which is made of a material compatible with HDPE and another part of which is made of a material having limited deformation and/or creep (POM, PA, PEEK, PPA, metal, etc.).

Preferably, the pillar consists of two materials (more preferably: HDPE and a reinforced and/or reinforcing material like POM or polyoxymethylene) for resistance purposes (body of the pillar) and attachment needs (flanges of the pillar). In that embodiment, the two parts made of different material are preferably overmoulded. Also, in that embodiment, there are preferably two portions of the pillar length where the cross section/diameter is diminishing/reducing: a first transition portion in the overmoulding area and a second more in the centre of the pillar.

According to a preferred embodiment of the invention, at least one part of the hollow pillar is a constitutive element of an accessory that has an active role in the tank (degassing, gauging, fuel trap, etc). Generally, the accessory in question includes at least one active component present in a chamber/housing, and preferably at least one part of the hollow pillar constitutes, in this case, at least one part of said housing. In other words: the wall of the hollow pillar preferably constitutes at least one part of the housing of the accessory, as it is described in the above captioned patent application WO 2010/122065, the content of which is incorporated by reference in the present patent application.

According to a first advantageous variant of this embodiment of the invention, the hollow pillar comprises, in its internal volume, at least one part of a ventilation system that connects the inside of the tank to the outside, generally via a canister or another pollution-control device.

In a preferred subvariant, it is a liquid/vapour separator (or LVS) i.e. a hollow volume having an internal geometry such that it favours the abatement of the drops of vapour present in the fuel vapours.

In another preferred subvariant, the accessory is an ROV and/or FLVV type valve and the active component integrated into the pillar is a float. In this case, at least one part of the hollow pillar constitutes the chamber in which the float slides.

According to a second advantageous variant of this embodiment of the invention, the hollow pillar acts as a housing for an overfill prevention device (OPD). In this variant, at least one part of the hollow pillar constitutes the chamber in which the OPD is located. Various ROVs may then be connected at the inlet to this OPD device.

In one preferred subvariant, it is possible to combine the LVS function and the OPD function in the pillar.

According to a third advantageous variant of this embodiment of the invention, the hollow pillar acts as a fuel trap (in other words: the accessory is a fuel trap) and, for this purpose, comprises in its internal volume at least one suction point for a fuel pump and very particularly preferably, a filter through which the pump sucks up.

According to a fourth advantageous variant of this embodiment of the invention, the hollow pillar comprises a capacitive gauge and acts as a protective chamber for the latter (i.e. constitutes its protective housing as it were). Its functions are in this case: to filter the effects of the waves (due to the movement of the fuel) and thus to reduce the fuel level measurement noise; to protect the measurement element from parasitic capacitances (by means of a choice of material for this purpose); and to reduce the effect of a film of fuel which is deposited on the sensitive element.

It should be noted that the various aforementioned variants may be combined within one and the same tank, or even: within one and the same pillar.

Figure 1:
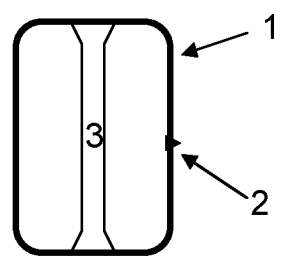
FIG. 1 depicts a one piece pillar according to the invention with a simple shape.
Figure 2:
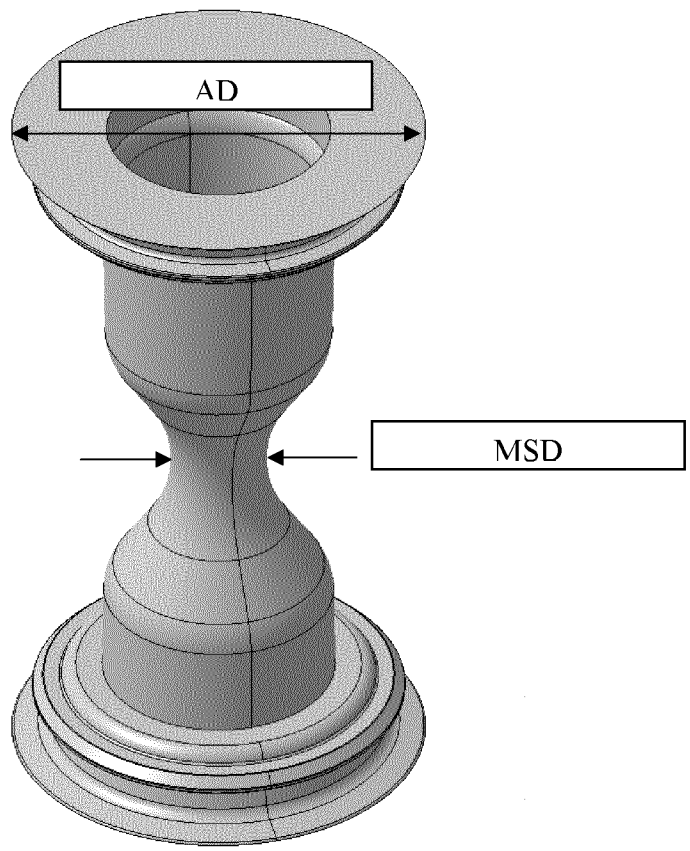
FIG. 2 depicts a 3d version of another embodiment of the invention.
Figure 3:
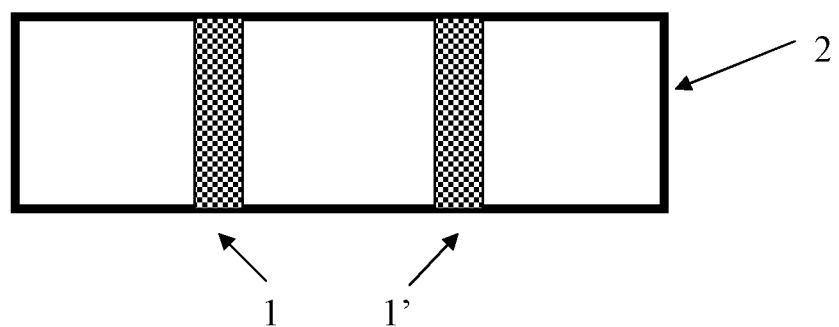
FIG. 3 shows an alternative reinforcement solution, not falling within the scope of the present invention.

FIG. 1 depicts a one piece pillar according to the invention with a simple shape (with constant evolution of the diameter of the cross sections); the following numerical references designate the following elements:
1: fuel tank shell
2: pinch line of the fuel tank (i.e. weld line of the two pre-moulded parison parts)
3: the reinforcing element The overall diabolo shape of the pillar according to a preferred embodiment is shown in FIG. 2 and can be characterized by an attachment diameter (AD) and by a minimum section diameter (MSD).

The attachment diameter is chosen quite big in order to catch a rather big tank surface and limit to almost 0 its deformation when pressure is inside the tank. Indeed, with a small cross section at the tank shell interface, it is necessary to multiply the quantity of pillars as explained in FIG. 2. This figure shows a straight pillar design with a rather high distance between the two pillars (1, 1'). This configuration allows a high deformation in the central point of the tank (2) in between both pillars which, depending on the deformation value and car environment, would need an additional pillar in between.

The smallest diameter section in the diabolo shape on the contrary, allows obtaining an easy break zone in all directions of an impact section.

This design was not evident to come up with especially since high impact tests are very difficult to simulate. This design seems to be the only one possible to obtain a reinforced plastic fuel tank limiting the tank deformations when the tank is pressurized combined with an easy breaking area to protect the tank shell from breaking during a high speed impact test (drop and/or SLED test).

The final reinforcement pillar shape has an overall dimension ratio of at least a factor 1.8, preferably at least a factor 2, between attachment diameter (AD) and the minimum section diameter (MSD).

The results achieved using this invention is to allow the design of a reinforced plastic based fuel tank allowing an important weight reduction compared to a steel fuel tank and by this, an exhaust reduction.

With other pillar designs, it is not possible to limit the tank deformation to typically 10 mm maximum at 350 mbar and pass the high impact resistance requirements.

Figure 4:
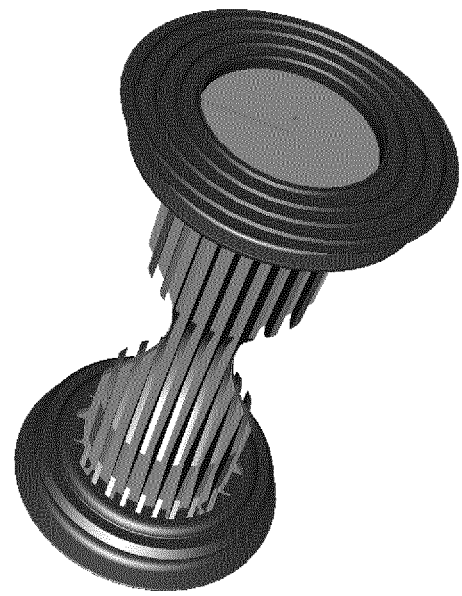
FIG. 4 depicts a pillar having a series of ribs.

FIG. 4 depicts another embodiment of the invention. In this embodiment the structure of the pillar consists of a series of ribs, shaped in the same manner as the previous embodiments, to control the break point. The advantage to this embodiment is the decreased complexity required to mould the center section of the part. Since the ribs are all in the same line of draw and there is no need to have a hollow interior, the slides required to mould the part on the end become sufficiently less complex.

The invention claimed is:

1. A fuel tank comprising:
   two opposite wall portions; and
   at least one reinforcing element connecting the two wall portions,
   wherein the reinforcing element includes a hollow pillar having a ratio of at least 1.8 between a diameter of its cross section at its ends and a diameter of its cross section at at least one intermediate point.

2. A fuel tank according to claim 1, which is a plastic fuel tank.

3. A fuel tank according to claim 1, wherein the two opposite wall portions respectively are a lower wall portion, aimed at facing downwards in a vehicle where the tank would be mounted, and an upper wall portion, aimed at facing upwards in the vehicle where the tank would be mounted.

4. A fuel tank according to claim 1, wherein the intermediate point with a reduced diameter does not extend over more than 90% of an entire length of the pillar and is located to cover a location of maximum stress in the pillar.

5. A fuel tank according to claim 4, wherein the diameter of the cross section in the area of the intermediate point is not constant from one cross section to another.

6. A fuel tank according to claim 1, wherein both ends of the pillar include connecting flanges.

7. A fuel tank according to claim 6, wherein the pillar comprises two transition portions where the diameter of its cross section is not constant: a first transition portion in a flange area and a second transition portion substantially in the center of the pillar.

8. A fuel tank according to claim 1, wherein the pillar has an axis of symmetry in rotation and a cross section such that when viewed in a vertical plane comprising the axis, the cross section comprises a portion that has a shape of a diabolo or of two opposite parabola linked by a middle portion of constant diameter or of a diameter which decreases from the parabola tops towards the center of the portion.

9. A fuel tank according to claim 8, wherein the parabolic surface on each side of the middle portion of the diabolo is prolonged by a cylindrical portion extending up to a connecting flange, and wherein the ratio between the diameter of the flange and the diameter of the cylindrical portion is of at least 1.25 and the ratio between the diameter of the cylindrical portion and the diameter of the central portion is of at least 1.5.

10. A fuel tank according to claim 1, wherein the pillar includes two different materials, and wherein two parts made of the different materials are overmolded.

11. A fuel tank according to claim 10, wherein the pillar comprises two transition portions where the diameter of its cross section is not constant: a first transition portion in an overmolding area and a second transition portion substantially in the center of the pillar.

12. A fuel tank according to claim 1, wherein the hollow pillar has an internal volume delimited by one external wall in a shape of a hollow pillar.

13. A fuel tank according to claim 1, wherein the hollow pillar has an internal volume between plural ribs of material, an external envelope of which having a shape of a hollow pillar.

14. A fuel tank according to claim 1, wherein the ratio of the diameters is between 1.8 and 5.

* * * * *

UNITED STATES PATENT AND TRADEMARK OFFICE
CERTIFICATE OF CORRECTION

| | | |
|---|---|---|
| PATENT NO. | : 9,027,781 B2 | Page 1 of 1 |
| APPLICATION NO. | : 14/110874 | |
| DATED | : May 12, 2015 | |
| INVENTOR(S) | : Bjorn Criel et al. | |

It is certified that error appears in the above-identified patent and that said Letters Patent is hereby corrected as shown below:

On the title page, Item (73), the Assignee's information is incorrect. Item (73) should read:

-- (73) Assignee: Inergy Automotive Systems Research (Societe Anonyme), Brussels (BE) --

Signed and Sealed this
Twenty-second Day of September, 2015

Michelle K. Lee
*Director of the United States Patent and Trademark Office*